Nov. 5, 1968    R. W. WALTERS    3,408,839
UNIVERSAL COMBINATION LUGGAGE LOCK
Filed July 16, 1965    6 Sheets-Sheet 1

INVENTOR
RUSSELL W. WALTERS

BY *Wilson H. Seppert*

ATTORNEYS

Nov. 5, 1968 R. W. WALTERS 3,408,839
UNIVERSAL COMBINATION LUGGAGE LOCK
Filed July 16, 1965 6 Sheets-Sheet 3

INVENTOR.
RUSSELL W. WALTERS
BY *Wilson H. Geppert*
ATTORNEYS

Nov. 5, 1968

R. W. WALTERS 3,408,839

UNIVERSAL COMBINATION LUGGAGE LOCK

Filed July 16, 1965

INVENTOR.
RUSSELL W. WALTERS

BY *Wilson T. Geppert*

ATTORNEYS

Nov. 5, 1968     R. W. WALTERS     3,408,839

UNIVERSAL COMBINATION LUGGAGE LOCK

Filed July 16, 1965

INVENTOR.
RUSSELL W. WALTERS

BY *Wilson T. Geppert*

ATTORNEYS

United States Patent Office 3,408,839
Patented Nov. 5, 1968

3,408,839
UNIVERSAL COMBINATION LUGGAGE LOCK
Russell W. Walters, Rockford, Ill., assignor to National Lock Co., Rockford, Ill., a corporation of Delaware
Filed July 16, 1965, Ser. No. 472,472
18 Claims. (Cl. 70—285)

ABSTRACT OF THE DISCLOSURE

A universal combination luggage lock adapted for use on luggage or other articles having a case assembly secured to one section of an article of luggage adjacent the parting line, a separable cam housing on the other section of the article of luggage, and a release bar assembly reciprocably mounted on the case assembly. The case assembly includes a casing having therein a reciprocable latching bolt coupled to a reciprocable slotted fence plate, a plurality of fences received in the slots of the fence plate, and a plurality of indexing buttons with each button operatively connected to one of the fences; the casing having recesses cooperating with projections on said fences to allow the fence plate to reciprocate when the fences and buttons are properly positioned. The release bar is operatively connected to the fence plate and includes a rotatable key post to receive a key that can directly engage and actuate the latching bolt. The cam housing has a reciprocable latch plate adapted to interengage with the latching bolt and a pair of pivotally mounted spring-biased cam members operatively connected to the latching plate and which, in the latching position of the latch plate, engage in recesses formed in the casing.

---

The present invention relates to a lock assembly and especially to a novel combination lock adapted for use with luggage but not intended to be limited thereto as this assembly is susceptible of use with other closures in which adjoining members are secured in closed position and locked against unauthorized opening.

This lock assembly comprehends a novel combination lock capable of being unlocked either by indexing to a predetermined combination setting or in the alternative, by use of the proper key. Furthermore, this novel lock may be surface mounted or may be mortised flush, depending on its application to or mounting on luggage or closure members. In this novel embodiment, the lock assembly consists of three major assemblies; namely, (1) a case assembly including a latch or locking bolt, (2) a separable cam housing assembly including a latch plate and camming means, and (3) a release bar assembly mounted on the case assembly and having a release bar adapted to be actuated when the proper combination has been indexed or the lock may be key-operated by inserting and turning of the proper key to release the locking bolt from the cam assembly and its latch plate.

In this novel lock construction, the cam housing assembly comprises a unit mounted on one section of an article of luggage and separable from the adjoining unit mounted on the other section and comprising the combined case and release bar assemblies. This cam housing assembly includes a latching plate and camming means projecting into the case assembly and having latching engagement with a locking bolt in the housing of the case assembly, such locking bolt being capable of being released by proper manipulation of plural indexing buttons in the housing or by means of a key inserted into a key post in the release bar assembly at the base of the case assembly and when rotated in a clockwise direction actuates and releases the locking bolt from engagement with the latch plate for opening the lock by separation of the cam housing assembly from the case assembly.

It is an important object of the present invention to provide a luggage lock with plural slidable indexing buttons which when indexed to the proper selected combination or setting, and manual movement of the release bar to release position, releases the locking bolt from a latching plate and permits camming means and latching plate in the cam housing assembly to be retraced by spring pressure. In this novel lock assembly construction, the cam housing assembly at the upper or one end of the combination lock is separable from the case assembly to which the release bar assembly is connected, the release bar being movable longitudinally; i.e. laterally of the case assembly when the slidable indexing buttons are all moved to a pre-selected indexing position. This novel lock is also unique in that the latching plate retracting the latching bolt does not retract the release bar, so that locking may be effected by pushing on the latching plate regardless of the position of the buttons.

In this novel combination lock construction and assembly, the user need not manipulate the indexing buttons but by inserting the proper key into the key post disposed in the release bar assembly and turning of the key in a clockwise direction, causes the key to engage a talon or shoulder on the inner end of the bolt and move this spring-loaded bolt horizontally to disengage the latching end of the bolt from the spring-biased latch plate, whereupon the latter is moved vertically or outwardly with its cam members in the cam housing and thereby releasing and separating the cam housing assembly from the bolt in the case assembly, permitting opening of the luggage.

Another important object of the present invention is the provision of means permitting the operator or user to selectively change the combination of the indexing buttons. In the novel illustrative embodiment, each button is capable of movement to plural or three positions; an upper, intermediate and lower position, this novel embodiment permitting the operator to select any one of twenty-seven combinations through use of the proper key in a manner as hereinafter more fully disclosed.

Further objects are to provide a construction of maximum simplicity, efficiency, economy and ease of assembly and operation, and such further objects, advantages and capabilities as will later more fully appear and are inherently possessed thereby.

Referring to the novel illustrative embodiment disclosed in the drawings, the present novel combination lock comprises three main assemblies, including a case assembly 1, a cam housing assembly 2 at one end of the assembly 1 and a release bar assembly 3 at the other end of the case assembly 1, all shown mounted upon an article of luggage 4 in such manner that the separable cam housing assembly 2 is mounted on one divided section 5 of the luggage and the combined case and release bar assemblies 1 and 3 are mounted on the other luggage section 6, whereby these sections may be opened when the cam housing assembly 2 is released and disengaged from the case assembly 1. In the present invention, this may be accomplished by means of the proper key 7 inserted and turned in the key slot 8 of a key post 9 mounted in the release bar assembly 3, or by proper locating and indexing of plural buttons 11 each located and slidable in one of the spaced slots 12 in the upper or outer face of the case assembly 1, whereby to release the locking mechanism by longitudinal movement of the release bar 13 laterally of the casing or housing 14 of the case assembly 1.

The case assembly 1 comprises the casing or housing 14 having the spaced slots 12 in its outer face through each of which extends an indexing projection 15 on the external face of each indexing button 11, these buttons being preferably formed of nylon or other plastic composition. Each button is provided in its rear face with spaced rearwardly opening slots 16, 17 and 18 extending to and open at one vertical edge and provided on the other vertical edge with a centrally disposed ear or detent 19 and an adjacent longitudinal elongated slot 21. At the rear of each button is provided a fence 22 each having a forwardly projecting pin or embossment 23 received in one of the slots 16, 17 or 18 and along one edge an ear or lug 24 abutting the open slotted edge of its associated button 11.

The housing is recessed and receives a fence plate 25 at the rear of the buttons 11 with the fence plate having spaced elongated slots 26, 27 and 28 each conformably and slidably receiving therein a fence 22, each fence having a pin 23 received in a slot 16, 17 or 18 and an ear 24 abutting the adjacent vertical face of a button. The fence plate 25 has an extended reduced and notched end 29 adapted to be projected through a slot 31 in the lower or outer end of the release bar assembly 3 capable of being moved laterally of the casing or housing 14 for releasing a latching bolt 32 from latching means in the cam housing assembly 2 when the operator has moved the buttons 11 to the pre-set selected position and then releases the bolt 32 by lateral movement of the release bar 13. This is accomplished without the use of a key 7.

In this unlocking of the bolt 32 by proper indexing of the buttons 11 and movement of the release bar 13, the latter actuates the fence plate 25 which in turn actuates the latching bolt 32 coupled to the fence plate to actuate and release the bolt. Such coupling includes an extension on one end of the fence plate 25 having spaced rearwardly extending projections 30, 30 adapted to engage the adjacent end of the underlying latching bolt 32.

The release bar assembly 3 is detachably mounted on and movable over the inner recessed end of the casing 14 and movable relative to the casing 14 by means of internal interlocking ribs, grooves and embossments formed in the release bar 13 and the overlapped adjacent end 33 of the casing 14 of the case assembly 1, the latter having outwardly opening end notches 34, 34 receiving conforming ribs 35 on the inner ends of the release bar 13, and a stop 36 projecting inwardly or rearwardly from the inner face of the release bar 13 and received in a slot 37 in the recessed front face of the end 33 of the housing 14, the slot 37 being of greater width than the stop to permit lateral movement of the release bar 13 relative to and over the end 33 of the casing 14.

Figure 1:
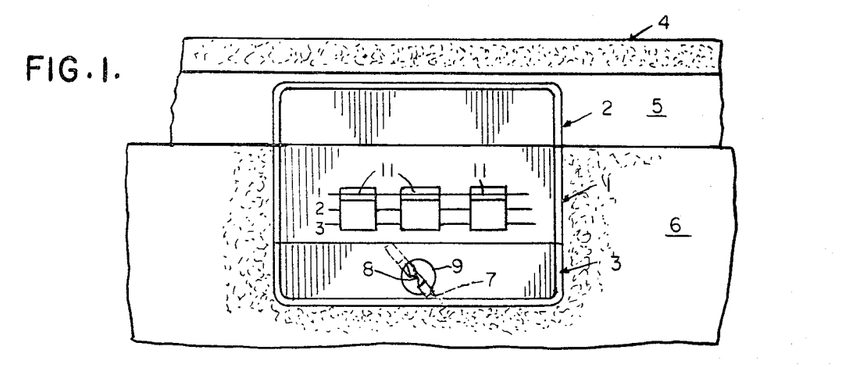
FIG. 1 is a top plan view of the novel universal combination luggage lock mounted on an article of luggage with the lock in closed position for retaining the luggage locked against unauthorized opening.

The release bar 13 has inserted centrally thereof the key post 9 having a keyway or slot 8 to receive the proper key 7 for operating the bolt 32 to unlock the luggage lock. This bolt is provided with lateral projections 39 and 41 at its opposite ends extending into corresponding slots 42 and 43 in the interior of the casing 14 which slots are so contoured and of such length as to permit the bolt to move laterally into and out of latching engagement with a latching plate 44 but retaining it against vertical movement. To effect such latching engagement, the latching plate 44 at the lower edge has a tang or hook 45 adapted to engage and interlock with a corresponding tang or hook 46 at the upper or inner end of the bolt 32. At the other or lower edge the bolt 32 is provided with a talon or projection 47 in alignment with and engaged by the key 7 when the latter is rotated in a clockwise direction through an arc of approximately 50° from the position shown in FIG. 1. Such engagement causes the key to move the latching bolt 32 laterally sufficiently to withdraw its tang or hook 46 from engagement beneath the tang or hook 45 on the latching plate 44 to release the latter and open the lock.

The latching bolt 32 is spring-biased toward latching position by means of a coil spring 48 mounted in a slot or recess 49 in the casing 14, one end of this spring abutting the closed end of the slot 49 and the other end seating in a notch 51 in the adjacent edge of the bolt, whereby this spring is retained under compression.

The latching plate 44 is slidably mounted in an outwardly opening slot 52 in the recessed cam housing 53 and provided with an external flanged end 54. The inner end of this latching plate is bifurcated to provide spaced legs 55 and 56 with an intermediate reduction providing a post 57 projecting opposite to that of the flanged end and extending to the rear of the cam housing 53. Each leg 55 and 56 is provided with an outwardly projecting ear 58 and the leg 55 is provided with the tang or hook 45 for latching engagement with the tang or hook 46 of the bolt 32.

Associated with and disposed adjacent the latching plate are two cam members 59 and 61 each pivotally mounted at one end on a post 62 on the interior of the cam housing 53. Each cam member adjacent its other end has an outward extending camming projection 63 and an indentation or slot 64, the latter conformably receiving an ear 58 projecting from the adjacent side of the legs 55 and 56 of the latching plate 44. Thus, as the latching plate is depressed, it carries along the cam members 59 and 61 which pivot and move the camming projections 63, one into the slot 42 behind the projection 39 of the bolt 32, and the other into a conforming slot 64a in the casing 14, thereby drawing up this casing by cam action at the extreme corners of the casing 14 when the projected flanged end 54 of the latching plate 44 is depressed and its tang or hook 45 engages and interlocks with the tang or hook 46 of the latching bolt 32.

To spring-bias and return the latching plate 44 and its cam members 59 to extended, released position, a spring 65 is provided in the cam housing 53. This spring is coaxially mounted by its central coils 66 and retained on the post 57 of the latching plate 44. The oppositely extending legs 67 and 68 of the spring 65 are so formed at their ends to be radially operable around the posts 62 in the cam housing 53. Initial spring tension is provided when the latching plate 44 is extended outwardly through the cam housing to its unlocked position. When the latching plate is depressed to closed or locking position, it carries along and pivots the cam members 59 and 61 and the tang or hook 45 on the latching plate 44 engages the tang or hook 46 located at the center of the latching bolt 32, such positioning providing direct action to the center of the lock thereby obtaining uniformity and equalization in closing and retaining the cam housing assembly 2 tightly engaged with the casing assembly 1. In this locking position, the spring tension is increased so that upon release of the latch bolt 32 from the latching plate 44, the latching plate is tensionally moved to unlocked position.

Figure 7:
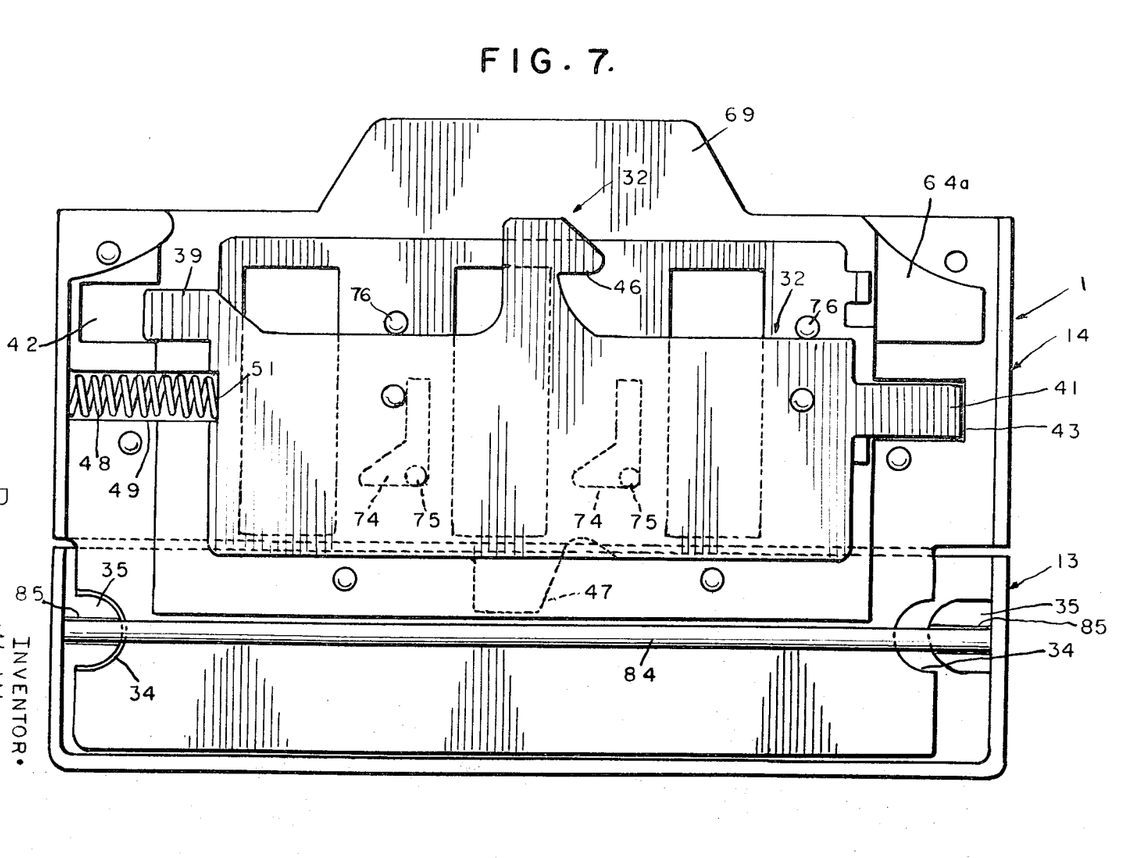
FIG. 7 is an enlarged view in rear elevation of the case assembly and release bar assembly with the rear
Figure 8:
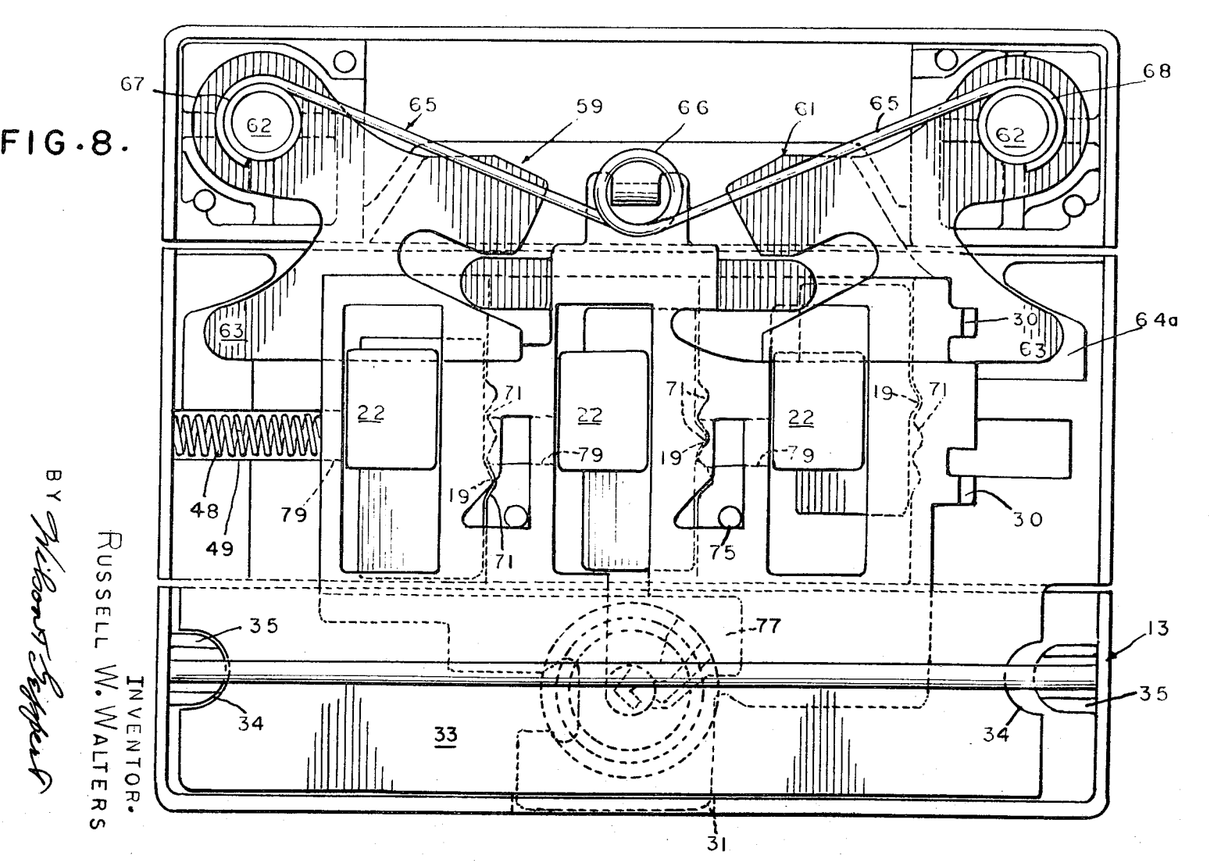
FIG. 8 is an enlarged view in rear elevation of the combined cam housing assembly, case assembly and release bar assembly, but with the cam housing and case covers and the latch bolt removed to disclose the fence plate and the assembled individual fences and indexing buttons.

The casing 14 as shown in FIG. 7 has a projecting lip 69 adapted to be received in a recess 70 in the cam housing assembly 2 alongside the latching plate 44 as shown in FIG. 8.

Each slidable indexing button 11 is individually spring-biased and to accomplish this individual uniform spring suspension each is provided with an ear 19 and an adjacent elongated slot 21, with the ear of each button providing a detent adapted to ride over and be received in one of plural slots or indentations 71 provided in the interior of the casing 14. By providing these buttons of nylon or relatively flexible plastic composition and with an elongated slot 21 adjacent the ear, the ear is adapted to be compressed as it rides over each indexed slot, thereby producing a uniform spring action for tensionally retaining each index button until manually disengaged.

The slots 26, 27 and 28 in the fence plate 25 are separated by the portions 72 and 73 in each of the latter being a slot 74 receiving a post 75 on the bolt 32, each slot provided with an inclined surface. The fence plate 25 has detent stops 76 and an irregularly shaped slot 77 having an inclined surface 78.

Each slot 26, 27 and 28 is of such width as to conformably receive a fence 22 but of a length to permit each fence to move lengthwise with its connected indexing button 11 to any one of the plural indexing positions. When the individual buttons have all been moved to a position in which the ear or post 24 of each fence 22 is aligned with its gate or slot 79 in the interior of the casing 14, the fence plate 25 is movable laterally by movement of the release bar 13 and the fence plate in turn moves the latching bolt 32 to release position in which it is disengaged from the latching plate 44.

The plural indexing buttons 11, the plural fences 22 which abut the rear of the buttons, the fence plate 25 in which the fences 22 are slidably positioned in their slots 26, 27 and 28 of the fence plate, and the latching bolt 32 are all disposed in abutting laminar position in the interior of the casing 14 and retained in such position by a rear cover plate 81 made of spring metal and holds the bolt 32, fences 22, fence plate 25 and slide or indexing buttons 11 in a floating position within the casing 14 and maintained thereby in their proper operative assembly. This cover also provides uniform spring tension to the locking detents or stops 76 of the fence plate 25, and includes a stop 82 to prevent any undue pressure against the indexing or slide buttons 11 during operation or by malicious intent to disengage the bolt 32 or fence plate 25 from their normal operative position.

The cam housing assembly 2 is also provided with a rear cover 83 and the release bar assembly is affixed to the casing 14 by means of retainer pin 84 having its ends embedded in slots 85 at the rear of the release bar 13.

Figure 2:
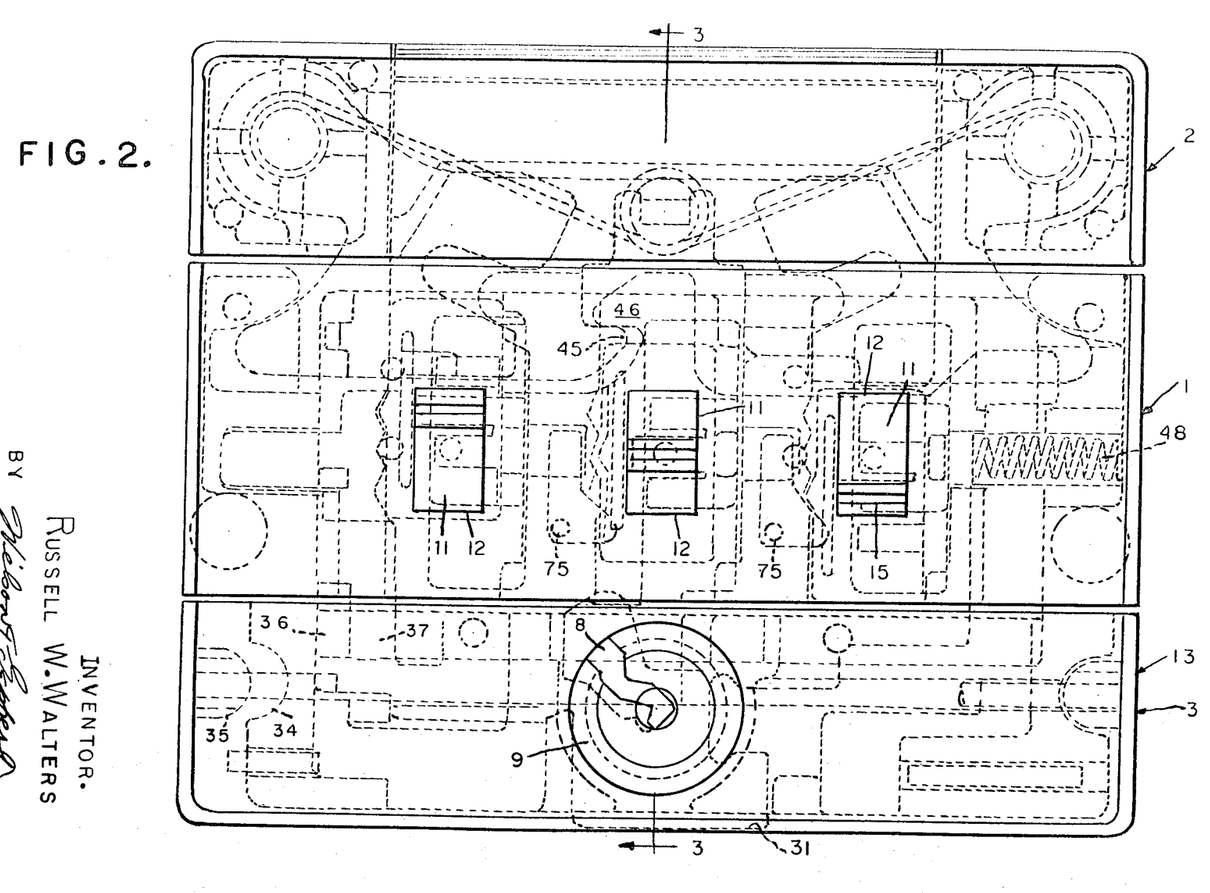
FIG. 2 is an enlarged top plan view of the luggage lock, and showing in dotted outline the internal mechanism.
Figure 3:
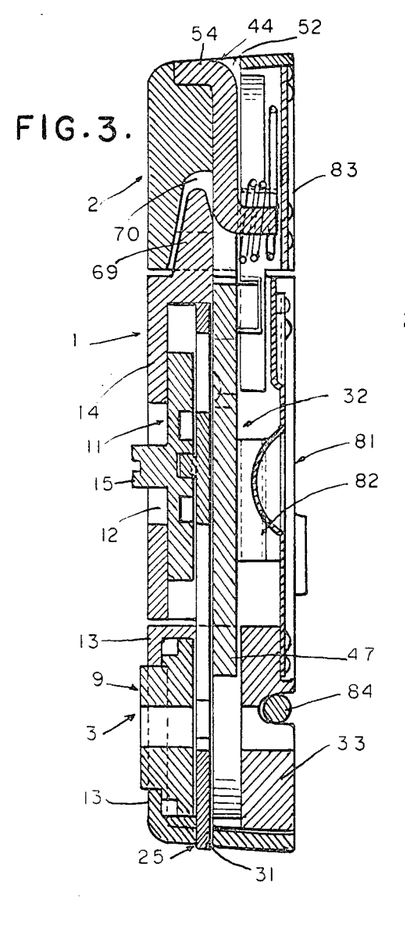
FIG. 3 is a vertical cross sectional view taken on the line 3—3 of FIG. 2.
Figure 4:
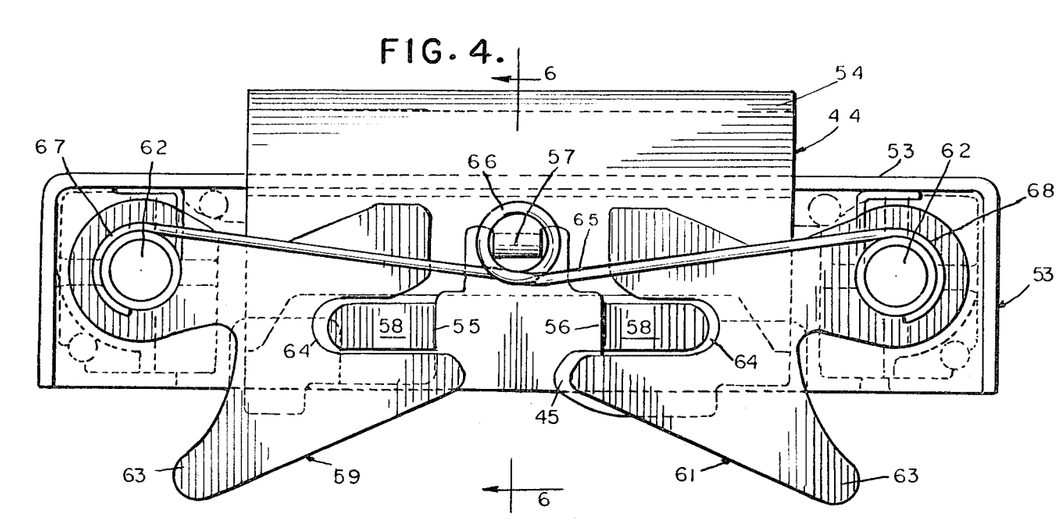
FIG. 4 is an enlarged view in rear elevation of the internal mechanism in the cam housing assembly, the rear cover of the housing being removed and the latching plate extended or retracted to its unlocked position.
Figure 5:
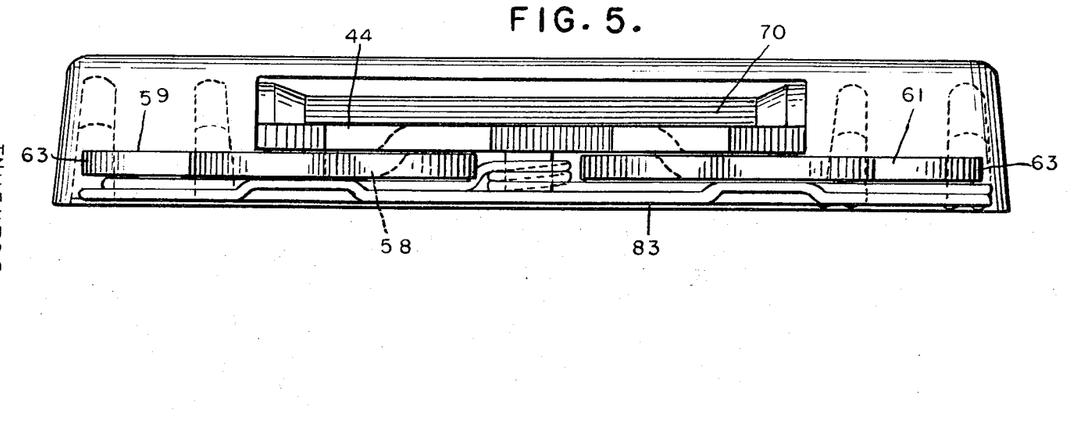
FIG. 5 is an enlarged bottom plan view of the cam housing assembly showing the spring-biased cam members and latching plate.
Figure 6:
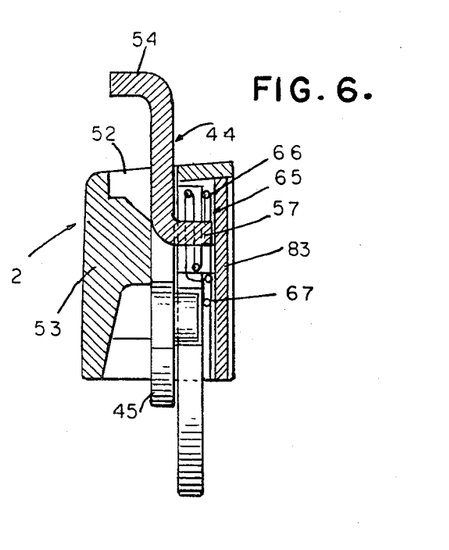
FIG. 6 is a vertical cross sectional view taken on the line 6—6 of FIG. 4 but including the complete cam housing assembly in latching position.
Figures 9, 10, 14, 15:
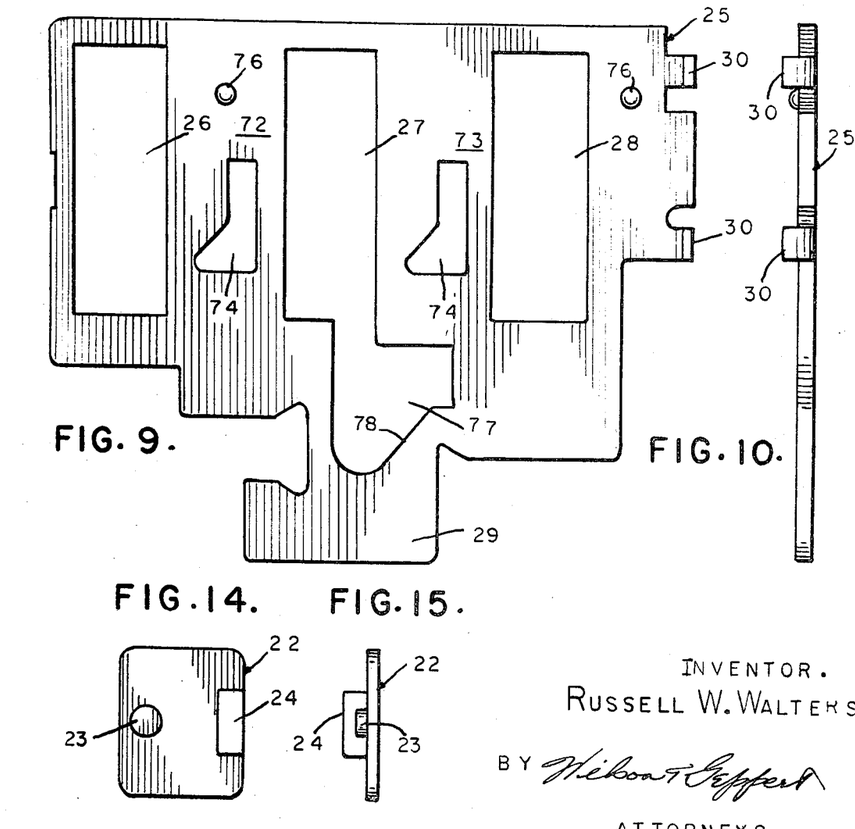
FIG. 9 is an enlarged rear elevational view of the disassembled fence plate.
FIG. 10 is an end elevational view of the fence plate of FIG. 9.
FIG. 14 is an enlarged front elevational view of one of the fences each mounted at the rear of an indexing button.
FIG. 15 is an end elevational view of FIG. 14.
Figure 11:
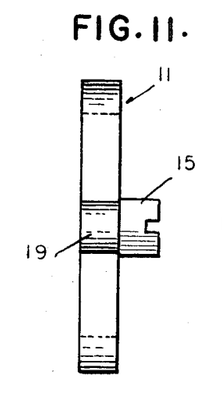
FIG. 11 is an enlarged end elevational view of one of the indexing buttons.
Figure 12:
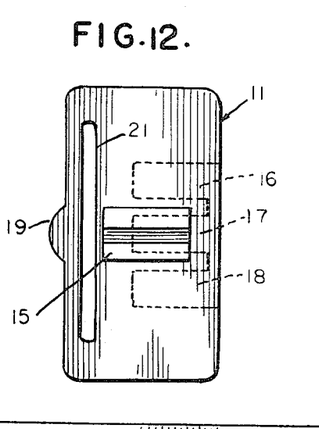
FIG. 12 is a front elevational view of the button of FIG. 11.
Figure 13:
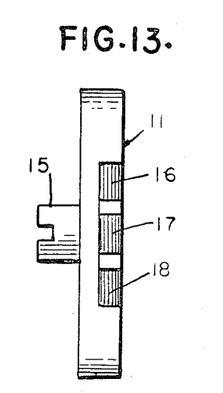
FIG. 13 is an end elevational view of the indexing button taken from the end opposite FIG. 11 to disclose the three spaced slots or tracks opening rearwardly and at one end.

Should the user of this lock desire to make any change in the previously selected combination, he inserts the key 7 into the key post 9 in the release bar assembly 3 and rotates the key in a counterclockwise direction as seen in FIG. 2 after moving all the indexing buttons to the uppermost or one position (FIG. 1), or if the buttons were already positioned in the selected combination the key engages the surface 78 of the slot 77 in the fence plate 25 (FIG. 9) and moves the latter downwardly whereby to disengage the stops 76 on the rear of the fence plate from the latching bolt 32. This movement carries the fence plate stops to the lowermost detent openings in the latching bolt 32 and simultaneously moves the indexing buttons 11 and their fences 22 to the previously selected combination, although, if the selected combination had been made prior to insertion of the key 7, there is no movement of the buttons 11.

Further movement of the key 7 in a counterclockwise direction moves the fence plate 25 laterally against spring pressure of the spring 48 abutting and spring-biasing both the latching bolt 32 and the fence plate 25 by means of the ears 24 on the fences 22; the notch in the notched end 29 of the fence plate allowing lateral movement thereof relative to the release bar 13. This motion also moves the latching bolt 32 to its unlatched position, revealing the depending tail 29 of the fence plate 25 at the bottom of the release bar and disclosing that the lock assembly is ready for the user to reset and select another combination. At this time, the cam housing assembly 2 has been unlocked from the latching bolt 32 of the case assembly 1.

The user may now change any button 11 to a different combination as each slide or selector button 11 is disengaged from its fence 22 with the fence ears or posts 24 being locked within the gates or slots 79 against movement. Next the key 7 is turned in a clockwise direction which allows the latching bolt 32 and the fence plate 25 to move horizontally or laterally with the help of the bolt spring 48 back to their locking positions and then by continued rotation of the key 7 in a clockwise direction moves the fence plate 25 vertically upward, thereby moving the detent stops from their lowermost position to their uppermost position relative to the latching bolt 32, and returning the fence plate 25 to its normal position. This is done by rotating the key past its insertion position to the 12 o'clock position, such movement first causing the key to engage the horizontal edges of the slot 77, the engagement moving the fence plate 25 part of the way back to its normal position; the key then engages the latch bolt projection 47 and retracts the latch bolt 32. This causes the posts 75 on the bolt 32 to move horizontally against the inclined surfaces provided by the slots 74 of the fence plate 25, the posts 75 first engaging the upper ends of the inclined surfaces. Thus, the bolt 32 moves the fence plate further vertically upward allowing the fence plate and its stops 76 to attain their normal positions. Upon removal of the key, the newly selected combination is available for use.

From the above description and disclosure in the drawings, it will be evident that the present invention comprehends a novel combination lock adapted to be open either by selected actuation of slidable indexing buttons or by key operation, and in which the combination of the indexing buttons may be readily changed by the user in a novel manner.

While the present novel combination has been shown and described as being advantageously applicable to luggage locks, it is not the intention to unnecessarily limit the scope or the utility of the novel features by virtue of the illustrated embodiment or limited disclosure.

Having thus disclosed the invention, I claim:

1. In a combination lock adapted for key or indexing button operation, comprising a case assembly including a casing, indexing buttons projecting through spaced openings in the casing and manually movable to selected positions in said casing, a reciprocable latching bolt in said casing, means for actuating said bolt to release position when the indexing buttons have been manually moved to a preselected position, said means including a release bar extending parallel to and adjacent one edge of the casing, and a cam housing assembly extending parallel to and abutting the opposite edge of the casing and separable therefrom to open the lock, said latter assembly having a spring-biased latching plate reciprocable toward and away from the casing with said latching plate and latching bolt having interlocking projections which are disengaged upon movement of the release bar to release position, said casing having an opening in said opposite edge receiving the projection on the latching plate.

2. In a combination lock as set forth in claim 1, in which said cam housing assembly also includes camming members connected to and movable with said latching plate, said camming members having interlocking engagement with said casing when the latching plate and latching bolt are in interlocking engagement.

3. In a combination lock adapted for key or indexing button operation, comprising a case assembly including a casing, indexing buttons projecting through spaced openings in the casing and manually movable to selected positions in said casing, a latching bolt in said casing, means for actuating said bolt to release position when the indexing buttons have been manually moved to a preselected position, said means including a release bar at one end of the casing, and a cam housing assembly at the other end of the casing and separable therefrom to open the lock, said latter assembly having a spring-biased latching plate with said latching plate and latching bolt having interlocking projections which are disengaged upon movement of the release bar to release position, and camming members connected to and movable with said latching plate and each caming member being pivotally mounted on the cam housing and having a projection pivoted into interlocking engagement with said casing when the latching plate and latching bolt are in interlocking engagement.

4. In a combination lock as set forth in claim 3, in which said release bar contains a key post and key slot for receiving a key, the key when inserted and rotated engaging and retracting the latching bolt from engagement with and releasing the latching plate, camming members and cam housing for separation from the case assembly to open the lock.

5. In a combination lock adapted to be unlocked either by inserting and turning of the proper key or by means of manual adjustment of plural indexing buttons to a preselected combination, comprising an assembly including a casing enclosing a reciprocable latching bolt, spaced slots in the front face of said casing, indexing buttons slidably mounted within the casing with an indexing projection on each button extended through an open slot and shiftable longitudinally in its slot to plural positions, means for selectively positioning said buttons in a prearranged combination for retracting the latching bolt and permitting opening of the lock, a housing separable from said casing including a spring-biased reciprocable latching plate for interlocking engagement with the latching bolt and pivotally mounted opposed camming members operatively connected with said latching plate for interlocking engagement with said casing when the latching plate and latching bolt are in interlocking engagement upon closing of the lock, and a release bar affixed to but movable relative to the casing when said indexing buttons are all moved to their preselected positions for releasing the latching bolt from said latching plate, said release bar including a key post and key slot for insertion of a proper key which when inserted and turned in a clockwise direction engages a part on said latching bolt and withdraws the latter from locking engagement with and releases the latching plate and housing for opening the lock.

6. In a combination lock construction comprising a case assembly and a separable cam housing assembly, said case assembly including a casing having a face plate provided with plural elongated slots each having an outer opening, a plastic button in each slot having an outer indexing projection extending through an aligned opening for manual actuation and plural tracks in the rear of each button, a fence plate having plural elongated slots, a fence longituditionally movable in each slot of the fence plate and each fence having a pin projecting forwardly into one of the plural tracks of a button and an ear at one side of each fence projecting forwardly at one side of its button, the ear of each fence adapted to be aligned with a slot in the casing permitting lateral movement of its fence when its button is moved to a preselected position by lateral movement of the fence plate, a latching bolt positioned rearwardly of and in abutting relation with said fence plate and adapted to be coupled to the fence plate, a spring-biased latching plate and camming members in said cam housing assembly with said latching plate having a part interengaging with a part on said latching bolt and the camming members having interlocking engagement with the interior of the casing upon closing of the lock, and means for releasing the latching bolt from said latching plate for opening the lock.

7. In a combination lock construction as set forth in claim 6, in which the means for releasing the latching bolt comprises a release bar mounted on the casing for movement relative to the casing and in such movement retracting the latch bolt from the latching plate.

8. In a combination lock construction as set forth in claim 7 in which said release bar is movable to retract the latch bolt only when the indexing buttons have been moved to their preselected indexing position.

9. In a combination lock construction as set forth in claim 6 in which the means for releasing the latching bolt comprises a release bar mounted on the casing for movement relative to the casing and engaging and moving the fence plate, its indexed fences and latching bolt to retract the latter from interlocking engagement with the latching plate thereby releasing the latter and its camming members and permitting separation of the cam housing assembly from the case assembly to open the lock.

10. In a combination lock adapted for key or indexing button operation and in which the combination may be changed by the authorized user, comprising a case assembly including a casing, indexing buttons projecting through spaced openings in the casing and manually movable to selected positions in said casing, a latching bolt in said casing, means for actuating said bolt to release position when the indexing buttons have been manually moved to a preselected position, said means including a release bar at one end of the casing, a cam housing assembly at the other end of the casing and separable therefrom to open the lock, said latter assembly having a spring-biased latching plate with said latching plate and latching bolt having interlocking projections which are disengaged upon movement of the release bar to release position, said release bar having a key post provided with a key slot receiving a proper key for disengaging the latching bolt from the latching plate when said key is rotated in one direction, and means actuated by turning the key in the opposite direction for releasing the indexing buttons from their previous indexing position and permitting the user to change the combination by shifting the position of the buttons.

11. In a combination lock adapted to be locked either by inserting and turning of the proper key or by means of manual adjustment or plural indexing buttons to a preselected combination, comprising an assembly including a casing enclosing a latching bolt, spaced slots in the front face of said casing, indexing buttons slidably mounted within the casing with an indexing projection on each button extended through an open slot and shiftable longitudinally in its slot to plural positions, means for selectively positioning said buttons in a prearranged combination for retracting the latching bolt and permitting opening of the lock, a housing separable from said casing including a spring-biased latching plate for interlocking engagement with the latching bolt and camming means for interlocking engagement with said casing when the latching plate and latching bolt are in interlocking engagement upon closing of the lock, a release bar affixed to but movable relative to the casing when said indexing buttons are all moved to their preselected position, and key-operated means for releasing the buttons from their preselected indexing position and permitting the user to change the combination.

12. In a combination lock as set forth in claim 10, in which the means actuated by turning of the key in the opposite direction for releasing the indexing buttons from their previous indexing position and permitting the user to change the combination by shifting the position of the buttons, includes a fence plate associated with end positioned adjacent the latching bolt and retracted horizontally and then moved vertically by turning the key in a clockwise direction, a fence at the rear of each button and each carried in one of plural slots in the fence plate, detent stops on said fence plate movable from their lower to their upper positions relative to the latching bolt, slots provided in the fence plate having an inclined surface, posts on said latching bolt projecting into and movable in the slots of the fence plate, whereupon moving the posts on the latching bolt horizontally against the fence plate on the incline of its slots, such rotation of the key forces the latching bolt vertically upward and permits the fence plate stops to move to neutral position and normal locking positions of the fence plate to the latching bolt.

13. In a combination lock as set forth in claim 12, in which each indexing button for re-setting the combination of any button is disengaged from its fence and the fence posts are locked in gates provided in the interior of the casing.

14. In a combination lock as set forth in claim 6, in which the casing has a rear cover plate of spring metal retaining the bolt, fences, fence plate and indexing buttons in a floating and operative position within the casing, said cover having a stop to prevent undue pressure against the indexing buttons during operation or by malicious intent to disenage the buttons or their fence plates from their normal operative position.

15. In a combination lock as set forth in claim 14, in which the fence plate has locking detents and the cover provides uniform spring tension to the locking detents of the fence plate.

16. In a combination lock adapted for key or indexing button operation, comprising a case assembly including a casing, indexing buttons projecting through spaced openings in the casing and manually movable to selected positions in said casing, a latching bolt in said casing, means for actuating said bolt to release position when the indexing buttons have been manually moved to a perselected position, a release bar at one end of the casing, and a cam housing assembly at the other end of the casing and separable therefrom to open the lock, said latter assembly having a spring-biased latching plate with said latching plate and latching bolt having interlocking projections which are disengaged upon movement of the release bar to release position, said means for actuating said bolt including a fence plate and individual fences each movably and adjustably mounted in one of plural elongated slots in said fence plate and each fence also movable laterally in a preselected position to permit lateral movement of the fence plate and the latching bolt to release the latter from the latching plate.

17. In a combination lock adapted for key or indexing button operation, comprising a case assembly including a casing, indexing buttons projecting through spaced openings in the casing and manually movable to selected positions in said casing, the individual buttons each having a detent along one edge and adjacent thereto an elongated slot permitting the detent to be compressed, said casing having longitudinally spaced indentations each adapted to receive a detent as each button is manually moved longitudinally along said indentations to provide individual spring indexing of each button in a selected indentation, a latching bolt in said casing, means for actuating said bolt to release position when the indexing buttons have been manually moved to a preselected position, said means including a release bar at one end of the casing, and a cam housing assembly at the other end of the casing and separable therefrom to open the lock, said latter assembly having a spring-biased latching plate with said latching plate and latching bolt having interlocking projections which are disengaged upon movement of the release bar to release position.

18. In a combination lock adapted for key or indexing button operation, comprising a case assembly including a casing, indexing buttons projecting through spaced openings in the casing and manually movable to selected positions in said casing, said individual buttons being of a a plastic composition and each has a detent along one edge and an elongated slot adjacent said edge to permit the detent to be compressed, said casing having longitudinally spaced cavities each adapted to receive and tensionally retain a detent and its button in indexing position, thereby effecting spring suspension and retention of each button in a preselected indexing position, a latching bolt in said casing, means for actuating said bolt to release position when the indexing buttons have been manually moved to a preselected position, said means including a release bar at one end of the casing, and a cam housing assembly at the other end of the casing and separable therefrom to open the lock, said latter assembly having a spring-biased latching plate with said latching plate and latching bolt having interlocking projections which are disengaged upon movement of the release bar to release position.

References Cited

UNITED STATES PATENTS

| | | | |
|---|---|---|---|
| 802,501 | 10/1905 | Fulton | 70—156 |
| 908,691 | 1/1909 | Nielsen | 70—297 |
| 1,236,402 | 8/1917 | Christie | 70—297 |
| 1,499,963 | 7/1924 | Beckman | 70—298 |
| 2,580,830 | 1/1952 | Pelle | 70—285 |
| 2,997,872 | 8/1961 | Fry | 70—156 |

FOREIGN PATENTS 989,968　5/1951　France.

MARVIN A. CHAMPION, *Primary Examiner.*

E. J. McCARTHY, *Assistant Examiner.*